(12) United States Patent
Rodrigues et al.

(10) Patent No.: US 7,964,686 B2
(45) Date of Patent: Jun. 21, 2011

(54) AQUEOUS TREATMENT COMPOSITIONS AND POLYMERS FOR USE THEREIN

(75) Inventors: Klein A. Rodrigues, Signal Mountain, TN (US); Adrian Zuberbuehler, Luzern (CH); Stuart Holt, Luzern (CH); Kevin Beairsto, Signal Mountain, TN (US)

(73) Assignee: Akzo Nobel N.V., Arnehm (NL)

( * ) Notice: Subject to any disclaimer, the term of this patent is extended or adjusted under 35 U.S.C. 154(b) by 0 days.

(21) Appl. No.: 11/734,937

(22) Filed: Apr. 13, 2007

(65) Prior Publication Data

US 2007/0185295 A1 Aug. 9, 2007

Related U.S. Application Data

(63) Continuation of application No. 10/962,101, filed on Oct. 8, 2004, now abandoned.

(60) Provisional application No. 60/553,082, filed on Mar. 15, 2004.

(51) Int. Cl.
*C08F 12/30* (2006.01)

(52) U.S. Cl. ............ 526/287; 526/288; 526/307.4; 526/307.7; 526/307.8; 526/317.1; 526/318.2; 526/318.25; 526/318.4; 526/318.5; 526/329.2; 526/347; 210/698; 210/701

(58) Field of Classification Search .......... 526/287, 526/288, 307.4, 307.7, 307.8, 317.1, 318.2, 526/318.25, 318.4, 328.5, 329.2, 347; 210/698, 210/701

See application file for complete search history.

(56) References Cited

U.S. PATENT DOCUMENTS

| | | | |
|---|---|---|---|
| 4,460,477 A | 7/1984 | Costello et al. | |
| 4,663,071 A | 5/1987 | Bush et al. | |
| 4,711,725 A | 12/1987 | Amick et al. | |
| 4,906,397 A | 3/1990 | Leighton et al. | |
| 5,061,396 A | 10/1991 | Lovine et al. | |
| 5,087,682 A | 2/1992 | Iovine et al. | |
| 5,149,455 A | 9/1992 | Jacobs et al. | |
| 5,160,657 A | 11/1992 | Bortolotti et al. | |
| 5,164,108 A | 11/1992 | Appel et al. | |
| 5,277,823 A | 1/1994 | Hann et al. | |
| 5,278,267 A | 1/1994 | Ponticello et al. | |
| 5,516,432 A | 5/1996 | King et al. | |
| 5,547,612 A | 8/1996 | Austin et al. | |
| 5,611,939 A | 3/1997 | Hernandez-Mena et al. | |
| 5,698,512 A | 12/1997 | Austin et al. | |
| 5,721,313 A | 2/1998 | Wai-Kwing et al. | |
| 6,162,391 A | 12/2000 | Kowata et al. | |
| 6,239,091 B1 | 5/2001 | Tartakovsky et al. | |
| 6,326,343 B1 | 12/2001 | Ghatlia et al. | |
| 6,395,185 B1 | 5/2002 | Gauthier et al. | |
| 6,617,302 B2 | 9/2003 | Ghatlia et al. | |
| 6,787,506 B2 | 9/2004 | Blair et al. | |
| 7,087,189 B2 * | 8/2006 | Austin et al. ............ 252/180 |
| 2003/0073586 A1 | 4/2003 | Crossman et al. | |
| 2003/0173303 A1 | 9/2003 | Austin et al. | |
| 2004/0127377 A1 | 7/2004 | Rodrigues | |

FOREIGN PATENT DOCUMENTS

| | | |
|---|---|---|
| DE | 1469837 | 1/1969 |
| DE | 1 963 398 | 12/1969 |
| EP | 0 122 013 A1 | 10/1984 |
| EP | 0 182 600 A3 | 5/1986 |
| EP | 0727448 A1 | 8/1996 |
| EP | 0 798 320 A2 | 10/1997 |
| EP | 0 877 002 A2 | 11/1998 |
| WO | 9620962 A1 | 7/1996 |
| WO | WO 03/060054 A2 | 7/2003 |

OTHER PUBLICATIONS

Derwent Abstract No. 0000176121 of German Patent No. 1469837.
Derwent Abstract of German Patent Publication No. 1 963 398 (1971).
Opposition Papers for EP Application No. 005223.2; Apr. 13, 2010.

* cited by examiner

*Primary Examiner* — Bernard Lipman
(74) *Attorney, Agent, or Firm* — James C. Abruzzo

(57) ABSTRACT

Aqueous treatment composition for use as anti-scalant and dispersant. The composition includes a polymer containing low amounts of sulfonate that prove as effective in carbonate and phosphate inhibition as polymers containing much higher amounts of sulfonate.

7 Claims, No Drawings

AQUEOUS TREATMENT COMPOSITIONS AND POLYMERS FOR USE THEREIN

CROSS REFERENCE TO RELATED APPLICATIONS

The present application is a continuation of U.S. application Ser. No. 10/962,101, filed 8 Oct. 2004, now abandoned which claims the benefit of U.S. Provisional Application No. 60/553,082, filed 15 Mar. 2004.

BACKGROUND OF THE INVENTION

1. Field of the Invention

This invention relates aqueous treatment compositions for use as an anti-scalant and dispersant. Further, this invention relates to polymers for use in such compositions. More specifically, this invention relates to polymers containing low amounts of sulfonate and their use in aqueous treatment compositions, including scale minimization.

2. Background Information

There are many aqueous industrial systems that require various materials remain in a soluble, or suspended, or dispersed state. Examples of aqueous systems include boiler water or steam generating systems, cooling water systems, gas scrubbing systems, pulp and paper mill systems, desalination systems, fabric, dishware, hard surface cleaning systems and downhole systems encountered during the production of gas, oil, and geothermal wells. In many cases, water contains (either naturally or by contamination) ingredients such as inorganic salts, which can cause accumulation, deposition, and fouling problems. These salts are formed by the reaction of metal cations such as calcium, magnesium or barium with inorganic anions such as phosphate, carbonate and sulfate. The salts formed have low solubility in water. As their concentration in solution increases or as the pH or temperature of the water containing them increases, the salts tend to precipitate from solution, crystallize and form hard deposits or scale on surfaces. Scale formation is a problem in equipment such as heat transfer devices, boilers, secondary oil recovery wells, and automatic dishwashers, as well as on substrates washed with such hard waters.

Many cooling water systems made from carbon steel experience corrosion problems, including industrial cooling towers and heat exchangers. Corrosion is combated by the addition of various inhibitors such as orthophosphate compounds and/or zinc compounds. However, phosphate addition increases the formation of highly insoluble phosphate salts such as calcium phosphate. The addition of zinc compounds can also lead to the precipitation of insoluble salts such as zinc hydroxide, and zinc phosphate. Further, other inorganic particulates such as mud, silt and clay are commonly found in cooling water. These particulates tend to settle onto surfaces, thereby restricting water flow and heat transfer unless they are effectively dispersed.

Stabilization of aqueous systems containing scale-forming salts and inorganic particulates involves a variety of mechanisms. One stabilization mechanism is dispersion of precipitated salt crystals due to adsorption of the inhibitor onto precipitated crystals. Adsorption of the inhibitor can also stabilize the system by facilitating the dispersion and subsequent removal of other suspended particulates from aqueous systems such as mud, silt and clay, and metals such as iron and zinc and their insoluble salts. Another stabilization mechanism involves interference and distortion of the crystal structure of the scale by the inhibitor, making the scale less adherent to surfaces or other forming crystals or existing particulates.

In aqueous drilling mud, a dispersant's ability to deflocculate and disperse flocculated and agglomerated solids is highly desired, especially in electrolyte-rich fluids. Conventionally used polyacrylates are known to be sensitive to divalent cations, which may be introduced into drilling fluid through electrolyte-releasing formations containing gypsum, lime and other salt deposits, or through the water used in formulating the mud (e.g., sea water). Accordingly, there is a need for products that provide rheological stability to polyelectrolyte-containing drilling mud, particularly to high solids mud (i.e., having densities greater than 15 pounds per gallon).

In ferro-cement compositions, polymeric additives are employed that improve physical characteristics, e.g., flow and workability. These additives, often referred to as 'plasticizers', also improve the flow characteristics of the compositions containing them, enabling the cement compositions to be pumped or poured effectively and fill all spaces in a mold or other structure. Such additives can also be used in designing ferro-cement compositions having reduced water content but still retaining adequate flow properties.

In cleaning compositions polymers can impart many useful functions. For example, they can function either independently or concurrently as viscosity reducers in processing powdered detergents. They can also serve as anti-redeposition agents, dispersants, scale and deposit inhibitors, crystal modifiers, and/or detergent assistants that are capable of partially or completely replacing materials used as builders while imparting optimum detergent action properties to surfactants.

Recent trends have been to reduce or eliminate the use of inorganic phosphates due to environmental pollution problems. In this regard, a variety of other methods of water softening have been employed, of which one of the most economical is the addition of alkali metal carbonate salts. However, these salts are effective by removing hardness ions via precipitation, thereby leaving unacceptable levels of residue on washed articles. Accordingly, there is a need for polymers that exhibit both superior threshold inhibition (i.e., they maintain hardness ions in solution past their normal precipitation concentration) and crystal modification (which can prevent the unacceptable levels of residue adhering on the washed articles).

Polymers have found wide utility in machine dishwashing applications by performing many of the same functions as in fabric laundering formulations. However, these polymers may be required to perform different functions due to differences between dishwashing and fabric formulations, the substrates being cleaned, and the machines themselves. Polymers are added in order to disperse particulate matter and prevent soils that have been removed from the article from agglomerating and re-adhering to the surface of the cleaned article, as well as minimize filming and spotting of the substrate. Machine dishwasher formulations differ from home laundry compositions in one respect in that most dishwashers require higher wash temperatures. Dishwashing machines typically utilize internal heating elements to increase the temperature of the water to optimum operating temperature. Under these conditions, the heating element can form surface deposits that significantly reduce its efficiency. Polymers that are able to remove these deposits are thus often added to machine dishwasher formulations. These polymers must be hydrolytically stable at the higher wash temperatures, as well as the pH conditions encountered in these systems.

SUMMARY OF THE INVENTION

It is generally recognized that a high degree of sulfonation, i.e., greater than 4.0 mole %, is required for calcium phosphate scale inhibition. However, according to the present invention very low amounts of sulfonate give more than acceptable performance. As a consequence, the polymer compositions of the present invention have the added benefit of being less expensive than their high sulfonate counterparts. The polymers of the present invention are useful in water treatment compositions, oil field related compositions such as cement compositions, cleaning formulations and other aqueous treatment compositions.

Some of these aqueous treatment compositions operate at high pH conditions. It is important for the polymers in those compositions to withstand these high pH conditions. Hydrolytically stable polymers according to the present invention that have non-ionic groups such as styrene and α-methyl styrene are resistant to these conditions.

Accordingly, in one aspect the present invention is directed towards a polymer for use in aqueous treatment compositions. The polymer has at least one carboxylic acid functionality, at least one nonionic functionality, and at least one sulfonate functionality, wherein the sulfonate functionality constitutes less than 4 mole % of the polymer except when the nonionic functionality is aromatic. When the nonionic functionality is aromatic, the sulfonate functionality can constitute up to at least 50 mole % or more of the polymer. However, cost considerations can limit this amount.

In one embodiment, the nonionic functionality contains an aromatic moiety. In one aspect, this aromatic moiety is styrene.

In one aspect, carboxylic functionality is present in an amount of about 45 mole % to about 98 mole %. In another aspect, the carboxylic functionality is present in an amount of about 70 mole % to about 90 mole %.

In one aspect, the nonionic functionality is present in an amount of about 0 mole % to about 50 mole %. In another aspect, the nonionic functionality is present in an amount of about 5 mole % to about 30 mole %. In another aspect, the sulfonate functionality is present in an amount of less than about 2 mole %.

When present in an aqueous treatment composition, the polymer is present in an amount of about 0.001% to about 25% by weight of the aqueous treatment composition. In another aspect, the polymer is present in an amount of about 0.5% to about 5% by weight of the composition.

In one embodiment, the carboxylic functionality is selected from the group consisting of acrylic acid, methacrylic acid, maleic acid, itaconic acid and combinations thereof. In one embodiment, the nonionic functionality is selected from the group consisting of methyl(meth)acrylate, ethyl(meth)acrylate, t-butyl(meth)acrylate, methyl(meth) acrylamide, ethyl(meth)acrylamide, t-butyl(meth)acrylamide, styrene, α-methyl styrene and combinations thereof. In another embodiment, the sulfonate functionality is selected from the group consisting of sodium (meth)allyl sulfonate, vinyl sulfonate, sodium phenyl(meth)allyl ether sulfonate, 2-acrylamido-methyl propane sulfonic acid and combinations thereof.

In another aspect the present invention is directed towards a polymer useful in scale inhibition and as a dispersant and having at least one structural unit derived from at least one carboxylic monomer having the general formula (I)—

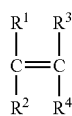

(I)

wherein $R^1$ to $R^4$ are independently hydrogen, methyl, carboxylic acid group or $CH_2COOH$ and wherein the carboxylic acid groups can be neutralized.

The scale-inhibiting polymer further includes at least one structural unit derived from at least one nonionic monomer having the general formula (II)—

(II)

wherein $R^5$ is hydrogen, $C_1$ to $C_6$ alkyl, or $C_1$ to $C_6$ hydroxyalkyl, and X is either aromatic with $R^5$ being hydrogen or methyl when X is aromatic, or X is the general formula (III)—

(III)

wherein $R^6$ is, independently of $R^5$, hydrogen, $C_1$ to $C_6$ alkyl, or $C_1$ to $C_6$ hydroxyalkyl, and Y is O or N.

The scale-inhibiting polymer further includes at least one structural unit derived from at least one sulfonate monomer having the general formula—

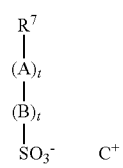

wherein $R^7$ is a group comprising at least one $sp^2$ bond, A is O, N, P, S or an amido or ester linkage, B is a mono- or polycyclic aromatic group or an aliphatic group, each t is independently 0 or 1, and $C^+$ is a cation, and wherein the sulfonate monomer is present in the polymer in an amount of less than about 4 mole %, except, as noted above, when X is aromatic.

DETAILED DESCRIPTION OF THE INVENTION

The low sulfonate polymers of the present invention provide excellent scale inhibition and deposition control under a wide variety of conditions. For instance, the inventive polymers have been found to be excellent in inhibiting calcium phosphate scale formation and deposition. Additionally, the polymers can inhibit deposition of silica, silicate anions and oxalate anions.

In treating cooling water, phosphonates and low molecular weight homopolymers are the primary calcium carbonate threshold inhibitors. The composition and molecular weight of the inventive polymers are such that the inventive polymers act as a dispersant and crystal modifier, thereby contributing to the inhibition of the formation and deposition of the calcium carbonate.

The low sulfonate polymers are highly effective at dispersing silt, sludge and other contaminates, including corrosion products and microbial debris. The polymers also are effective at dispersing particulate matter such as pigments, clays, salts, metallic ores and metallic oxides. Specific examples include, without limitation, iron oxide, kaolin clay, titanium dioxide, calcium carbonate and aluminum oxide.

In some aqueous treatment compositions, high pH conditions are encountered. Polymers containing ester groups tend to hydrolyze under these conditions. However, the hydrolytically stable polymers of this invention are able to withstand these high pH conditions. Thus, the polymers are stable at pH 9 and above that can be encountered in some water treatment and detergent applications. Further, the performance of these polymers does not drop or deteriorate over time when compared to other commercially available compositions.

As used herein, the polymers of the invention useful in aqueous treatment compositions can be prepared under free radical polymerization from the reaction of at least one carboxylic monomer, at least one non-ionic monomer and at least one sulfonate monomer. According to the present invention, the sulfonate group is present in the polymer in an amount of less than about 4 mole % except when the nonionic monomer is aromatic. In another embodiment, the sulfonate group is present in the polymer in an amount of less than about 2 mole %.

As to the polymer of the present invention that is useful in scale inhibition and as a dispersant, as noted above such polymer has at least one structural unit derived from at least one carboxylic monomer having the general formula (I)—

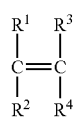

(I)

wherein $R^1$ to $R^4$ are independently hydrogen, methyl, carboxylic acid group or $CH_2COOH$ and wherein the carboxylic acid groups can be neutralized; at least one structural unit derived from at least one nonionic monomer having the general formula (II)—

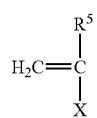

(II)

wherein $R^5$ is hydrogen, $C_1$ to $C_6$ alkyl, or $C_1$ to $C_6$ hydroxyalkyl, and X is either aromatic (with $R^5$ being hydrogen or methyl when X is aromatic) or X is of the general formula (III)

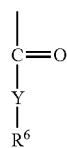

(III)

wherein $R^6$ is (independently of $R^5$) hydrogen, $C_1$ to $C_6$ alkyl, or $C_1$ to $C_6$ hydroxyalkyl, and Y is O or N; and at least one structural unit derived from at least one sulfonate monomer having the general formula—

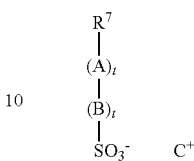

wherein $R^7$ is a group comprising at least one $sp^2$ bond, A is O, N, P, S or an amido or ester linkage, B is a mono- or polycyclic aromatic group or an aliphatic group, each t is independently 0 or 1, and $C^+$ is a cation. In one aspect, $R^7$ is a $C_2$ to $C_6$ alkene. In another aspect, $R^7$ is ethane, butene or propene. As previously noted, the sulfonate monomer is present in the polymer in an amount of less than about 4 mole % except when X is aromatic. In another aspect, the sulfonate functionality is present in an amount of less than about 2 mole %. In another aspect, the sulfonate functionality is present in an amount of up to about 50 mole % or greater when the nonionic functionality is aromatic.

In one aspect, the carboxylic monomer is present in an amount of about 45 mole % to about 98 mole %. In another aspect, the carboxylic monomer is present in an amount of about 70 mole % to about 90 mole %.

In one aspect, the nonionic functionality is present in an amount of about 0 mole % to about 50 mole %. In another aspect, the nonionic functionality is present in an amount of about 5 mole % to about 30 mole %.

In one aspect, the carboxylic monomer includes acrylic acid, maleic acid, itaconic acid and combinations thereof. In another aspect, the nonionic monomer includes methyl(meth)acrylate, ethyl(meth)acrylate, t-butyl(meth)acrylate, methyl (meth)acrylamide, ethyl(meth)acrylamide, t-butyl(meth) acrylamide, styrene, α-methyl styrene and combinations thereof. In one aspect, when the pH of the aqueous system is about 9 or greater, the nonionic monomer includes aromatics. In another aspect, when the pH of the aqueous system is about 9 or greater, the nonionic monomer includes styrene, α-methyl styrene and combinations thereof. In one aspect, the sulfonate monomer includes sodium (meth)allyl sulfonate, vinyl sulfonate, sodium phenyl(meth)allyl ether sulfonate, 2-acrylamido-methyl propane sulfonic acid and combinations thereof.

The polymers of the present invention can be prepared by any number of conventional means well known to those skilled in the art. These include, for instance, techniques such as bulk, emulsion, suspension, precipitation, or solution polymerization.

In one embodiment, the polymers are prepared in an aqueous medium in the presence of a catalyst capable of liberating free radicals under the reaction conditions employed. Suitable catalysts include peroxides such as benzoyl peroxide, azo compounds such as azobisisobutyronitrile, and peracid salts (e.g., sodium or potassium persulfate). Redox systems employing, for example, t-butyl hydroperoxide can also be used. The molecular weight of the polymers can be controlled by various compounds used in the art including, for example, chain transfer agents such as mercaptan, ferric and cupric salts, bisulfites, and lower alcohols such as isopropanol. The architecture of the polymers can vary also, e.g., they can be block polymers, star polymers, random polymers, etc.

The polymers can be added neat to the aqueous systems, or they can be formulated into various water treatment compositions and then added to the aqueous systems. In certain aqueous systems where large volumes of water are continuously treated to maintain low levels of deposited matter, the polymers can be used at levels as low as 0.5 mg/L. The upper limit on the amount of polymer used depends upon the particular aqueous system treated. For example, when used to disperse particulate matter the polymer can be used at levels ranging from about 0.5 to about 2,000 mg/L. When used to inhibit the formation or deposition of mineral scale the polymer can be used at levels ranging from about 0.5 to about 100 mg/L, in another embodiment from about 3 to about 20 mg/L, and in another embodiment from about 5 to about 10 mg/L.

Once prepared, the water-soluble polymers can be incorporated into a water treatment composition that includes the water-soluble polymer and other water treatment chemicals. These other chemicals can include, e.g., corrosion inhibitors such as orthophosphates, zinc compounds and tolyltriazole. As indicated above, the amount of inventive polymer utilized in the water treatment compositions varies based upon the treatment level desired for the particular aqueous system treated. Water treatment compositions generally contain from about 10 to about 25 percent by weight of the water-soluble polymer.

The polymers of this invention can also be used in a wide variety of cleaning formulations. For example, these formulations can be in the form of a powder, liquid or unit doses such as tablets or capsules. Further, these formulations can be used to clean a variety of substrates such as clothes, dishes, bathroom and kitchen surfaces. The formulations can also be used to clean surfaces in industrial and institutional cleaning applications.

In fabric cleaning detergent applications, the polymers are believed to improve detergency as a co-builder, inhibit soil redeposition and water hardness salt deposition, and function as a dispersant. The polymers can be used as a processing aid during blending, drying and agglomerating operations, thereby providing uniform distribution of the detergent composition's components, desired particle size and density, as well as other desirable attributes during manufacture and storage of detergents, especially powdered detergents. In liquid detergent compositions the polymers can act as a hydrotrope. In the wash liquor, the polymers can perform as a dispersant, co-builder and anti-redeposition agent.

Examples of detergent formulations that can be improved by the addition of the polymer of this invention are disclosed in U.S. Pat. Nos. 4,663,071, 4,906,397, 5,149,455, 5,160,657, 5,164,108, 5,061,396 and 5,087,682.

Aqueous compositions that can be improved by the addition of the present inventive polymers include detergent compositions having about 0 to about 80 weight % soda ash, about 5 to about 24 weight % surfactant, and about 0.5 to about 25 weight % of polymer. Alternatively, in a detergent composition having about 0 to about 80 weight % soda ash, about 5 to about 24 weight % surfactant, and about 0.5 to about 25 weight % zeolite builder, up to 100% of the zeolite builder can be replaced with an equivalent amount of the inventive polymers based on detergent composition dry weight basis.

In one embodiment, the polymer is incorporated into a powdered household laundry detergent formulation that includes about 10 to about 25 weight % surfactant(s), about 2 to about 63 weight % builder(s), and about 12 to about 88 weight % optional ingredients such as buffers, enzymes, softeners, anti-static agents, bleaches, optical brighteners, perfumes and fillers. The polymer is also useful in concentrated powdered detergents having at least 20% by weight surfactant.

In another embodiment, the polymer is incorporated into a liquid household laundry detergent formulation having about 5 to about 50 weight % surfactant(s), about 2 to about 55 weight % builder(s), and about 15 to about 95 weight % optional ingredients such as buffers, enzymes, softeners, anti-static agents, fluoresces, perfumes, water and fillers. Also included herein are any commercial or experimental detergent formulations that employ a phosphate co-builder or phosphate-replacer builder or co-builder or any builder that functions to sequester calcium, magnesium, barium and other polyvalent cations present in hard water. Formulations employing mixtures of builders, including phosphate-containing mixtures, are also useful. The polymer can be used as a co-builder, a builder, an anti-redeposition agent, an anti-encrustation agent, and as a processing aid in these detergents.

Optional components in the detergent formulations include, but are not limited to, ion exchangers, alkalies, anti-corrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers. These optional components may comprise up to about 90 weight % of the detergent formulation.

The polymers of this invention can be incorporated into hand dish, autodish and hard surface cleaning formulations. The polymers can also be incorporated into rinse aid formulations used in autodish formulations. Autodish formulations can contain builders such as phosphates and carbonates, bleaches and bleach activators, and silicates. These formulations can also include enzymes, buffers, perfumes, anti-foam agents, processing aids, and so forth.

Hard surface cleaning formulations can contain other adjunct ingredients and carriers. Examples of adjunct ingredients include, without limitation, buffers, builders, chelants, filler salts, dispersants, enzymes, enzyme boosters, perfumes, thickeners, clays, solvents, surfactants and mixtures thereof.

One skilled in the art will recognize that the amount of polymer(s) required depends upon the cleaning formulation and the benefit they provide to the formulation. In one aspect, use levels can be about 0.01 weight % to about 10 weight % of the cleaning formulation. In another embodiment, use levels can be about 0.1 weight % to about 2 weight % of the cleaning formulation.

The following examples are intended to exemplify the present invention but are not intended to limit the scope of the invention in any way. The breadth and scope of the invention are to be limited solely by the claims appended hereto.

Example 1

Polymer of Acrylic Acid ('AA'), Styrene, Sodium Methallyl Sulfonate ('SMS') and Sodium Phenylmethallyl Ether ('SPME') in the Mole Ratio 89:10:0.57:0.43—

An initial charge of 150 g deionized water, 120 g isopropyl alcohol, 3.2 grams SMS and 4.0 grams SPME was added to a 1-liter glass reactor fitted with a lid and having inlet ports for an agitator, water cooled condenser and for the addition of monomer and initiator solutions. The reactor contents were heated to reflux (approximately 85° C.). At reflux, continuous additions of 226 g of acrylic acid and 36.1 g of styrene were added concurrently to the reactor with stirring over a period of 3 hours. During the same time period and for 30 additional minutes, an initiator solution of 13.3 grams sodium persulfate dissolved in 80 grams water was also added.

At the end of the initiator addition, a 50% aqueous sodium hydroxide solution (251 g) along with 100 grams water was added. The alcohol co-solvent (approximately 200 grams) was removed from the polymer solution by azeotropic distillation.

Examples 2-10

Polymer Stability to Hydrolysis at High pH Aqueous Systems—

Using the procedure of Example 1, the following polymers were synthesized—

TABLE 1

Polymers Synthesized

| Example | Mole % acrylic acid | Mole % styrene | Mole % SMS | Mole % SPME |
|---|---|---|---|---|
| 2 | 80.7 | 18 | 1.3 | 0 |
| 3 | 81.2 | 18 | 0 | 0.82 |
| 4 | 89 | 10 | 0.57 | 0.45 |
| 5 | 94 | 5 | 0.57 | 0.45 |
| 6 | 82.59 | 16 | 1.41 | 0 |
| 7 | 82.88 | 16 | 0.62 | 0.5 |
| 8 | 83.11 | 16 | 0 | 0.89 |
| 9 | 80.88 | 18 | 0.62 | 0.5 |
| 10 | 78 | 20 | 1 | 1 |

Examples 11-24

Using the Procedure of Example 1, the Following Polymers were Synthesized—

TABLE 2

Polymers Synthesized

| Example | Mole % AA | Mole % MMA | Mole % SMS | Mole % SPME | Mole % Styrene | Mole % methacrylic acid (MAA) |
|---|---|---|---|---|---|---|
| 11 | 68 | 30 | 1 | 1 | 0 | 0 |
| 12 | 73 | 25 | 1 | 1 | 0 | 0 |
| 13 | 78 | 20 | 1 | 1 | 0 | 0 |
| 14 | 83 | 15 | 1 | 1 | 0 | 0 |
| 15 | 88 | 10 | 1 | 1 | 0 | 0 |
| 16 | 93 | 5 | 1 | 1 | 0 | 0 |
| 17 | 85 | 13 | 1 | 1 | 0 | 0 |
| 18 | 68 | 0 | 1 | 1 | 30 | 0 |
| 19 | 85 | 0 | 1 | 1 | 13 | 0 |
| 20 | 68 | 13 | 1 | 1 | 0 | 17 |
| 21 | 78 | 20 | 1 | 1 | 0 | 0 |
| 22 | 88 | 10 | 1 | 1 | 0 | 0 |
| 23 | 93 | 5 | 1 | 1 | 0 | 0 |
| 24 (Comparative with high sulfonate) | 81 | 13 | 4 | 4 | 0 | 0 |

Example 25

Polymer of Acrylic Acid ('AA'), Styrene And Sodium Methallylsulfonate ('SMS') in the Mole Ratio 80:10:10.

An initial charge of 150 g deionized water, 120 g isopropyl alcohol, and 55.0 grams SMS was added to a 1-liter glass reactor fitted with a lid and having inlet ports for an agitator, water cooled condenser and for the addition of monomer and initiator solutions. The reactor contents were heated to reflux (approximately 85° C.). At reflux, continuous additions of 226 g of acrylic acid and 34.8 g of styrene were added concurrently to the reactor with stirring over a period of 3 hours. During the same time period and for 30 additional minutes, an initiator solution of 13.3 grams sodium persulfate dissolved in 80 grams water was also added.

At the end of the initiator addition, a 50% aqueous sodium hydroxide solution (251 g) along with 100 grams water was added. The alcohol cosolvent (approximately 200 grams) was removed from the polymer solution by azeotropic distillation.

Example 26

Stability of Polymers in High pH Systems—

The polymers of Examples 1, 2 and 3 were blended (1% dosage) into 2% NaOCl solutions, with the pH of the solutions adjusted to 12.5 with NaOH. Samples of the solutions were then stored at 50° C. and at room temperature. The polymers were also blended into Cascade liquid dish detergent at 1%. These samples were stored at room temperature and at 32° C. (90° F.). The NaOCl concentration of all samples was evaluated over time.

TABLE 3

Effect on Bleach
2% Bleach solutions:

| | Initial | | 1 Week | | 2 Week | |
|---|---|---|---|---|---|---|
| | % NaOCl | PH | % NaOCl | pH | % NaOCl | PH |
| Sample @ 50° C. | | | | | | |
| Control | 1.99 | 12.48 | 1.94 | 12.49 | 1.81 | 12.65 |
| Example 1 | 1.98 | 12.54 | 1.87 | 12.54 | 1.72 | 12.58 |
| Example 2 | 2.00 | 12.57 | 1.85 | 12.48 | 1.70 | 12.53 |
| Example 3 | 1.97 | 12.5 | 1.84 | 12.48 | 1.68 | 12.55 |
| Example 24 | 1.97 | 12.5 | 0.8 | 12.48 | 0.2 | 12.55 |
| Sample @ RT | | | | | | |
| Control | 1.99 | 12.48 | 1.99 | 12.48 | 1.97 | 12.50 |
| Example 1 | 1.98 | 12.54 | 1.98 | 12.47 | 1.90 | 12.57 |
| Example 2 | 2.00 | 12.57 | 2.00 | 12.44 | 1.94 | 12.62 |
| Example 3 | 1.97 | 12.5 | 1.97 | 12.51 | 1.90 | 12.65 |
| Example 24 | 1.98 | 12.5 | 1.2 | 12.5 | 0.9 | 12.6 |

The data indicates that the level of bleach is maintained in the presence of polymers of this invention. However, that polymer having a high level of sulfonate (Example 24) depletes bleach to a great extent. This is partially due to the high sulfonate level of that polymer. Moreover, the MMA moiety of this polymer is not hydrolytically stable under the high pH required to stabilize hypochlorite bleach, whereas the styrene in Examples 1, 2 and 3 is.

Example 27

Molecular Modeling of Hydrolytically Stable Polymers and Measuring the Interaction Energy with a $CaCO_3$ Surface—

The following simulation method was utilized in determining the interaction energy between the polymers and a calcium carbonate surface—

Generate models of the each polymer segment.
Generate models of the cationic surface of the inorganic film.

Generate several hundred pair configurations by choosing random values for the six spatial variables that describe the relative orientations of two objects.

Optimize the atomic coordinates of the model by minimizing the molecular potential energy of the system. The coordinates of the inorganic film are fixed at their ideal crystal positions.

Compute the net interaction energy by subtracting the pair system energy from the energy of an isolated polymer chain and inorganic film slice.

The data generated by the simulation above is listed in Table 4 below—

TABLE 4

Simulation Data

| Polymer | Composition | Interaction energy of polymer with $CaCO_3$ (calcite) | Interaction energy of polymer with $MgCO_3$ (Magnasite) |
|---|---|---|---|
| Example 24 | High sulfonated polymer (comparative example) | 74.0 | 74.1 |
| Example 11 | Low sulfonated polymer | 84.7 | 76.3 |

The data indicates that the polymer of this invention (here, Example 11) has a greater attraction for the $CaCO_3$ crystal surface than high sulfonated polymers traditionally used in water treatment (here, Example 24). This implies that polymers of the invention tend to modify the crystal growing surface of $CaCO_3$ and $MgCO_3$. This modification of the crystal surface can be seen under a microscope. Thus, fluid movement easily removes carbonate deposits in the aqueous treatment systems of the present invention.

Example 28

Phosphate Inhibition Data using 20 ppm Orthophosphate and 150 ppm Polymer in the Aqueous Treatment System—

Phosphate Inhibition Test Protocol

Solution "A"

Using sodium hydrogen phosphate and sodium tetraborate decahydrate, Solution A was prepared containing 20 mg/L of phosphate, and 98 mg/L of borate at a pH of from 8.0-9.5.

Solution "B"

Using calcium chloride dihydrate and ferrous ammonium sulfate, Solution B was prepared containing 400 mg/L of calcium and 4 mg/L of iron at a pH of from 3.5-7.0.

Anti-Scalant Preparation

The total solids or activity for anti-scalant(s) to be evaluated was determined. The weight of anti-sealant necessary to provide a 1.000 g/L (1000 mg/L) solids/active solution was determined using the following formula:

$$(\% \text{ solids or activity})/100\% = \text{"}X\text{"}$$

wherein "X"=decimal solids or decimal activity. (1.000 g/L)/"X"=g/L anti-scalant required to yield a 1000 mg/L anti-scalant solution Sample Preparation Fifty (50) ml of Solution "B" was dispensed into a 125 ml Erlenmeyer flask using a Brinkman dispensette. Using a graduated piper, the correct amount of anti-sealant polymer solution was added to give the desired treatment level (i.e., 1 ml of 1000 mg/L anti-scalant solution=10 mg/L in samples). Fifty (50) ml of Solution "A" was dispensed into the 125 ml Erlenmeyer flask using a Brinkman dispensette. Using a Brinkman dispensette, at least three blanks (samples containing no anti-scalant treatment) were prepared by dispensing 50 ml of Solution "B" and 50 ml of Solution "A" into a 125-ml Erlenmeyer flask. The flasks were stoppered and placed in a water bath set at 70° C. +/−5° C. for 16 to 24 hours.

Sample Evaluation

All of the flasks were removed from the water bath and allowed to cool to the touch. A vacuum apparatus was assembled using a 250-ml side-arm Edenmeyer flask, vacuum pump, moisture trap, and Gelman filter holder. The samples were filtered using 0.2-micron filter paper. The filtrate from the 250-ml side-arm Erlenmeyer flask was transferred into an unused 100-ml specimen cup. The samples were evaluated for phosphate inhibition using a HACH DR/3000 Spectrophotometer, following the procedure set forth in the operator's manual.

Calculation of Percent Inhibition for all Samples

The percent inhibition for each treatment level is determined by using the following calculation—

$$\% \text{ Phosphate inhibition} = (S/T)*100$$

wherein S=mg/L Phosphate for Sample and T=mg/L Total Phosphate added

TABLE 5

Effect on Phosphate Inhibition

| Polymer | Composition | % phosphate inhibition |
|---|---|---|
| Control (no sulfonate) | Homopolymer of acrylic acid | 16.3 |
| Example 24 | Highly sulfonated polymer (comparative example) | 33.2 |
| Example 1 | Low sulfonated polymer according to the present invention | 34.0 |

Prior to the present invention it was believed that a high degree of sulfonation was required in order to get Ca phosphate scale inhibition. However, the above data indicates that very low amounts of sulfonate give more than acceptable performance benefits. These compositions have the added benefit of being less expensive than their high sulfonate counterparts.

FORMULATION EXAMPLES

Example 29

Personal Care Formulation

Water Repellant Sunscreen

| Ingredients | wt % |
|---|---|
| Glycerin | 5.0 |
| Polymer of Example 15 | 2.0 |
| PEG 100 stearate | 5.0 |
| Isostearyl stearate | 4.0 |
| Octyl methoxycinnamate | 7.5 |
| Butyl methoxydibenzoylmethane | 1.5 |
| Hexyl methicone | 5.0 |
| DI water | 70.0 |

Example 30

Textile Application

The polymer of Example 7 was padded on to cotton fabric during the textile finishing process. The weight of the polymer put on the fabric was 1.0 weight % based on weight of the fabric. The treated and finished fabric was then run through 25 cycles of a regular washing machine. The treated fabric exhibited less dye loss and wear and tear as compared to an untreated fabric.

Example 31

Typical Hard Surface Cleaning Formulations

| Ingredient | wt % |
| --- | --- |
| Acid Cleaner | |
| Citric acid (50% solution) | 12.0 |
| C12-15 linear alcohol ethoxylate with 3 moles of EO | 5.0 |
| Alkylbenzene sulfonic acid | 3.0 |
| Polymer of Example 12 | 1.0 |
| Water | 79.0 |
| Alkaline Cleaner | |
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of example 13 | 1.0 |

Example 32

Automatic Dishwash Formulation

| Ingredients | wt % |
| --- | --- |
| Sodium tripolyphosphate | 25.0 |
| Sodium carbonate | 25.0 |
| C12-15 linear alcohol ethoxylate with 7 moles of EO | 3.0 |
| Polymer of Example 11 | 4.0 |
| Sodium sulfate | 43.0 |

Example 33

Car Wash Rinse Off Aid Formulation

| Ingredients | wt % |
| --- | --- |
| Water | 80 |
| Butyl diglycol | 10 |
| Polymer of Example 6 | 10 |

Example 34-37

Water Treatment Compositions

Once prepared, the water-soluble polymers are preferably incorporated into a water treatment composition comprising the water-soluble polymer and other water treatment chemicals. Such other chemicals include corrosion inhibitors such as orthophosphates, zinc compounds and tolyl triazole. As indicated above, the level of the inventive polymer utilized in the water treatment compositions is determined by the treatment level desired for the particular aqueous system treated. The water treatment compositions generally comprise from 10 to 25 percent by weight of the water-soluble polymer. Conventional water treatment compositions are known to those skilled in the art and exemplary water treatment compositions are set forth below. These compositions containing the polymer of the present invention have application in, for example, the oil field.

| Formulation 1 | Formulation 2 |
| --- | --- |
| 11.3% Polymer 1 (40% active) | 11.3% Polymer 5 (40% active) |
| 47.7% Water | 59.6% Water |
| 4.2% HEDP | 4.2% HEDP |
| 10.3% NaOH | 18.4% TKPP |
| 24.5% Sodium Molybdate | 7.2% NaOH |
| 2.0% Tolyl triazole | 2.0% Tolyl triazole |
| pH 13.0 | pH 12.64 |

| Formulation 3 | Formulation 4 |
| --- | --- |
| 22.6% Polymer 10 (40% active) | 11.3% Polymer 1 (40% active) |
| 51.1% Water | 59.0% Water |
| 8.3% HEDP | 4.2% HEDP |
| 14.0% NaOH | 19.3% NaOH |
| 4.0% Tolyl triazole | 2.0% Tolyl triazole |
| pH 12.5 | 4.2% $ZnCl_2$ |
| | pH 13.2 |

Example 38

Cement Composition

Various quantities of the polymer produced as described in Example 1 above (a 9% by weight aqueous solution of the polymer) were added to test portions of a base cement slurry. The base cement composition included Lone Star Class H hydraulic cement and water in an amount of 38% by weight of dry cement. The base composition had a density of 16.4 pounds per gallon. These compositions containing the polymer of the present invention have application in, for example, the oil field.

One skilled in the art will recognize that polymers according to the present invention can be optimized for a particular aqueous composition. For example, this can be achieved by changing the monomer mole ratios, adjusting the molecular weight of the polymer, changing polymer architecture, etc. As a further example, by optimizing the molecular weight, the polymers according to the present invention can be used as calcium carbonate inhibitors. Finally, it should be recognized that by adding low levels of sulfonic acid to calcium carbonate anti-scalants, their ability to function in high electrolyte and/or high pH systems is improved.

As an illustration of polymer optimization, in aqueous compositions that are high in pH (e.g., greater than about 9), the hydrolytic stability of the polymer is important. Polymers containing ester or amide linkages will hydrolyze over time in these high pH aqueous compositions. This will result in the polymer functionality degrading with time, resulting in a loss of performance. This deficiency can be overcome by using a non-ionic group that does not contain an amide or ester linkage. As exemplified above, the polymers of the present invention overcome this problem, as they are hydrolytically stable under high pH conditions.

Although the present invention has been described and illustrated in detail, it is to be understood that the same is by way of illustration and example only, and is not to be taken as a limitation. The spirit and scope of the present invention are to be limited only by the terms of any claims presented hereafter.

We claim:

1. A cleaning formulation comprising:
a scale inhibiting polymer having at least one carboxylic acid functionality selected from the group consisting of acrylic acid, maleic acid, itaconic acid and combinations thereof, at least one nonionic functionality selected from the group consisting of methyl (meth)acrylate, ethyl (meth)acrylate, t-butyl (meth)acrylate, methyl (meth)acrylamide, ethyl (meth)acrylamide, t-butyl (meth)acrylamide, styrene, α-methyl styrene and combinations thereof, and at least one sulfonate functionality selected from the group consisting of sodium (meth)allylsulfonate, vinyl sulfonate, sodium phenyl (meth)allyl ether sulfonate, 2-acrylamido-methyl propane sulfonic acid and combinations thereof,
wherein the sulfonate functionality is equal to or less than about 2 mole % of the polymer;
the cleaning formulation further comprising about 2 to about 80% by weight builder(s), based on total weight of the formulation,
wherein the polymer is able to maintain a level of bleach in a high pH system.

2. The formulation of claim 1 wherein the at least one carboxylic functionality is present in an amount of about 45 mole % to about 98 mole %.

3. The formulation of claim 2 wherein the at least one carboxylic functionality is present in an amount of about 70 mole % to about 90 mole %.

4. The formulation of claim 1 wherein the at least one nonionic functionality is present in an amount of about 0 mole % to about 50 mole %.

5. The formulation of claim 4 wherein the at least one nonionic functionality is present in an amount of about 5 mole % to about 30 mole %.

6. The formulation of claim 1 wherein said cleaning formulation comprises an aqueous treatment composition which contains about 0.001 to about 25% by weight of the polymer.

7. The formulation of claim 6 wherein the aqueous treatment composition contains about 0.5 to about 5% by weight of the polymer.

* * * * *